(12) United States Patent
Yu et al.

(10) Patent No.: US 8,951,306 B2
(45) Date of Patent: Feb. 10, 2015

(54) FILM-TYPE SUPERCAPACITOR AND MANUFACTURING METHOD THEREOF

(75) Inventors: Jin Yu, Daejeon (KR); Jung Joon Yoo, Daejeon (KR)

(73) Assignee: Korea Advanced Institute of Science and Technology, Daejeon (KP)

( * ) Notice: Subject to any disclaimer, the term of this patent is extended or adjusted under 35 U.S.C. 154(b) by 99 days.

(21) Appl. No.: 13/612,106

(22) Filed: Sep. 12, 2012

(65) Prior Publication Data
US 2013/0182373 A1    Jul. 18, 2013

(30) Foreign Application Priority Data
Jan. 20, 2012  (KR) ........................ 10-2012-0006869

(51) Int. Cl.
H01G 9/00    (2006.01)

(52) U.S. Cl.
USPC ...................................... 29/25.03

(58) Field of Classification Search
None
See application file for complete search history.

(56) References Cited

U.S. PATENT DOCUMENTS

| | | | |
|---|---|---|---|
| 2009/0059474 A1 | 3/2009 | Zhamu et al. | |
| 2012/0170171 A1* | 7/2012 | Lee et al. | 361/502 |

FOREIGN PATENT DOCUMENTS

| | | | |
|---|---|---|---|
| JP | 5-326330 A | 12/1993 | |
| JP | 5-347233 A | 12/1993 | |
| JP | 2000-348976 A | 12/2000 | |
| JP | 2004-193466 A | 7/2004 | |
| JP | 2005-129566 A | 5/2005 | |
| JP | 2005-525674 A | 8/2005 | |
| JP | 2005-259728 A | 9/2005 | |
| JP | 2006-510235 A | 3/2006 | |
| JP | 2007-214391 A | 8/2007 | |
| JP | 2007-273943 A | 10/2007 | |
| JP | 2008-171733 A | 7/2008 | |
| JP | 2008-300191 A | 12/2008 | |
| JP | 2009-9871 A | 1/2009 | |
| JP | 2009-275225 A | 11/2009 | |
| JP | 2010-9980 A | 1/2010 | |
| JP | 2011-97031 A | 5/2011 | |
| JP | 2011-201735 A | 10/2011 | |
| JP | 2011-238589 A | 11/2011 | |

(Continued)

OTHER PUBLICATIONS

Yang, D., et al.; "*Chemical analysis of graphene oxide films after heat and chemical treatments by X-ray photoelectron and Micro-Raman spectroscopy;*" Carbon, vol. 47, No. 1; dated Jan. 209; pp. 145-152; retrieved on Jul. 19, 2013 from <http://www.google.com/url?sa=t&rct=j&q=&esrc=s&frm=1&source=web&cd=2&cad=rja&ved=0CDQQFjAB&url=http%3A%2F%2Fbucky-central.me.utexas.edu%2FRuoffsPDFs%2F181.pdf&ei=4ZjpUbjoEIT88QS-04G4DA&usg=AFQjCNHus82g5fcrMeJh4s6rRa37Mo2yhA&sig2=aTy5UbwxD_fQtdkhbW9Rnw&bvm=bv.49478099,d.eWU>.

(Continued)

*Primary Examiner* — Scott B Geyer
(74) *Attorney, Agent, or Firm* — Alston & Bird LLP (57) ABSTRACT

The present invention relates to a film-type micro-supercapacitor and a manufacturing method thereof including a method for manufacturing an electrode film by using graphene or graphene oxide, a method for forming a two-dimensional electrode by separating a graphene or graphene oxide electrode film into two independent electrodes through patterning, a method for forming an in-plane structure of the two-dimensional electrode, a method for forming a current collector on an electrode, and a method for manufacturing a supercapacitor with a micrometer thickness by supplying an electrolyte to the two-dimensional electrode.

12 Claims, 11 Drawing Sheets

(56) References Cited

FOREIGN PATENT DOCUMENTS

| JP | 2012-6826 A | 1/2012 |
| JP | 2012-23220 A | 2/2012 |

OTHER PUBLICATIONS

Yoo, J. J., et al.; "*Ultrathin Planar Graphene Supercapacitors*;" Nano Letters, vol. 11, No. 4; pp. 1423-1427; dated Mar. 2011; retrieved on Jul. 19, 2013 from <http://www.google.com/url?sa=t&rct=j&q=&esrc=s&frm=1&source=web&cd=3&cad=rja&ved=0CD8QFjAC&url=http%3A%2F%2Fglearning.tju.edu.cn%2Fpluginfile.php%2F73194%2Fmod_resource%2Fcontent%2F0%2F2011%2FUltrathin_Planar_Graphene_Supercapacitors.pdf&ei=9JbpUbuQJZKA8gT7iIDYDQ&usg=AFQjCNGkUrL75eo1ublX1UH2xMquu2NYDg&sig2=cMCRF-ik-UsyHR1mUH9Y6g&bvm=bv.49478099,d.eWU>.

\* cited by examiner

FILM-TYPE SUPERCAPACITOR AND MANUFACTURING METHOD THEREOF

CROSS-REFERENCE TO RELATED APPLICATION

This application claims priority to and the benefit of Korean Patent Application No. 10-2012-0006869 filed in the Korean Intellectual Property Office on Jan. 20, 2012, the entire contents of which are incorporated herein by reference.

BACKGROUND OF THE INVENTION (a) Field of the Invention

The present invention relates to a film-type supercapacitor and a manufacturing method thereof, including a method for manufacturing an electrode film by using graphene or graphene oxide, a method for forming a two-dimensional electrode by separating graphene or a graphene oxide electrode film into two electrodes through a patterning method, an in-plane structure of the two-dimensional electrode, a method for forming a current collector on a electrode, and a method for manufacturing a supercapacitor with a micrometer thickness by supplying an electrolyte to the two-dimensional electrode.

(b) Description of the Related Art

Portable electronic devices that have been down-sized have gradually developed into very small models, and batteries have been built into the portable electronic devices so as to maximize the performance in consideration of the devices becoming thinner. The portable electronic devices will eventually progress to devices that are very thin like paper so the batteries thereof must also become very thin, but the structures of lithium batteries that are currently in use are not suitable for or applicable to the very thin electronic devices.

Lithium thin-film batteries have been developed in order to solve the above-noted problem, but their charging performance per volume is worse than general lithium batteries, their production cost is three times as expensive, and they are congenitally dangerous because of the lithium. Therefore, it is difficult to apply them to bio-application fields such as artificial organs and micro-robots.

A supercapacitor that is quickly growing as a future energy storage means that will replace the lithium batteries is a next-generation energy storage device that can be quickly charged and discharged within several seconds, provides ten times higher power than rechargeable batteries, and provides a semi-permanent lifetime over 500,000 cycles. The energy storage of the supercapacitor per weight is substantially equivalent to $1/10$ that of conventional batteries and the energy storage level thereof per volume is similar to that of the lithium batteries, and recent reports say that the supercapacitor outperforms the existing batteries regarding energy density and power density per volume.

The energy storage level per volume is more important for a very small electronic device that is light in weight than the weight so the film-type micro-supercapacitor as a power supply means that is very appropriate for the very small electronic device. Also, the film-type micro-supercapacitor includes no rare earth resources or heavy metals so it is inexpensive and environmentally friendly, and it generates no oxidation-reduction reaction so it is future energy storage means that is not explosive at all and is totally safe. The film-type micro-supercapacitor will replace existing batteries and be used in the field of very small electronic devices requiring a very small power supply such as accessory-style portable telephones that are thin like paper, micro-robots, artificial organs, smart cards, microelectromechanical systems (MEMS), and paper-like displays.

Discussions about techniques and scientific research on the film-type micro-supercapacitor have just begun, as with development of the lithium thin-film batteries.

An experimental result that is obtained by developing a ultrathin film type supercapacitor using graphene and that has proven that the supercapacitor can replace the batteries regarding its performance has been published in Nano Letters (Yoo et al., 2011, Vol. 11, pp. 1423-1427). Further, the collaborative research team of Toulouse University (France) and Drexel University (US) manufactured a supercapacitor electrode by using onion-like carbon (OLC) to evaluate remarkable improvements of energy and power characteristics and reported them to Nature Nanotechnology (Brunet et al., Vol. 5, pp. 651-654).

In this report, comparisons on the lithium battery, the electrolyte solution capacitor, and the conventional supercapacitor have shown excellent performance by showing that the OLC-based supercapacitor outperforms the conventional supercapacitor, its energy characteristic is almost equal to or better than the lithium battery, and its power consumption is equivalent to that of the electrolyte solution capacitor. Rapid growth of film-type supercapacitor related techniques is expected, according to the report.

The supercapacitor includes no lithium at all so it is estimated to be the best power supply in the aspect of safety acquisition. However, the existing supercapacitor has the same structure as the general battery so it is not easy to down-size it. In other words, the conventional supercapacitor has a stack structure in which two electrodes, a current collector, and a separation film are stacked in a sandwich form, so it is difficult to manufacture the conventional supercapacitor in a very small and thin shape to be used for the MEMS. Particularly, when graphene is used for the supercapacitor, the stack structure has a problem of ion mobility so it substantially deteriorates efficiency.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a method for manufacturing a film-type supercapacitor, including: forming a current collector on both sides of an electrode film attached to a substrate; and forming two separated electrodes by patterning the electrode film with an in-plain structure.

Another embodiment of the present invention provides a film-type supercapacitor including a current collector on both sides of an electrode film, wherein the electrode film forms two electrodes that are patterned in an in-plain structure and are separated.

According to the embodiments of the present invention, the film-type micro-supercapacitor can be used to replace or support the battery in the field of very small electronic devices such as the microelectromechanical systems (MEMS), the paper-like display, and the smart card requiring a very small power supply. Further, the two-dimensional graphene micro-supercapacitor is applicable to the micro-energy storage device for very small electronic devices.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Parts that are irrelevant to the description are omitted in order to clearly describe the present invention, and like reference numerals designate like elements throughout the specification. In addition, unless explicitly described to the contrary, the word "comprise" and variations such as "comprises" or "comprising" will be understood to imply the inclusion of stated elements but not the exclusion of any other elements.

Electrode Material

Existing supercapacitors use activated carbon for the electrode material, and the activated carbon has some demerits when using it for the electrode material of the film-type supercapacitor according to an embodiment of the present invention.

First, the supercapacitor has a multi-layered structure for each atom, and the activated carbon has a lower specific surface area than graphene so a storage space of charges is relatively small. In addition, the activated carbon has low electrical conductivity to deteriorate efficiency of transferring charges, so in order to overcome this problem, carbon black with a low specific surface area and relatively high conductivity is used as an additive to manufacture the electrode. Therefore, the entire specific surface area of the electrode is further reduced.

Compared to this, the graphene has a surface area of 2630 m2/g which is very large when compared to the specific surface area (~10 m2/g) of graphite or the specific surface area (~500 m2/g) of activated carbon. Also, the electrical conductivity of the graphene is high so no additive such as carbon black is needed when the electrode is formed. An electrochemical property of graphene is very similar to that of the carbon nanotubes, and the graphene requires no complex refinement process like the carbon nanotubes so it is easier to process the graphene than the carbon nanotubes from the commercial viewpoint.

Second, a predetermined amount of catalyst material used when the carbon nanotubes are generated has been checked to remain when it has undergone a refinement process a plurality of times. The remaining impurity has an electrochemical activated characteristic in a metal nanoparticle form so it changes the entire electrochemical property of the carbon nanotubes. The characteristic can influence reliability of the supercapacitor.

In the case of graphene, no problem caused by the catalyst such as the carbon nanotubes is generated in most generation methods such as chemical vapor deposition and chemical peeling. Accordingly, the graphene is very appropriate for the electrode of an electrochemical energy storage device because of the high specific surface area, high electrical conductivity, and high electrochemical stability.

Electrode Structure

To manufacture the film-type supercapacitor according to the embodiment of the present invention, as much charge as possible must be stored in a limited volume. Accordingly, it is desirable to use a material with a multi-layered structure for providing a storage space of the stacked charges without wasting storage space.

The graphene has an atom-based multi-layered structure so it is appropriate for manufacturing the electrode of the film-type supercapacitor. In detail, the graphene can be manufactured to have a film shape by performing layer-by-layer self-assembly on the graphene, filtering the same, or casting the same.

When efficiency of the charge storage space is increased by using the stack structured graphene film as an electrode and the existing sandwich structured supercapacitor design is used, mobility of electrolyte ions is not fluent so the efficiency of the supercapacitor cannot be optimized.

Figure 1:
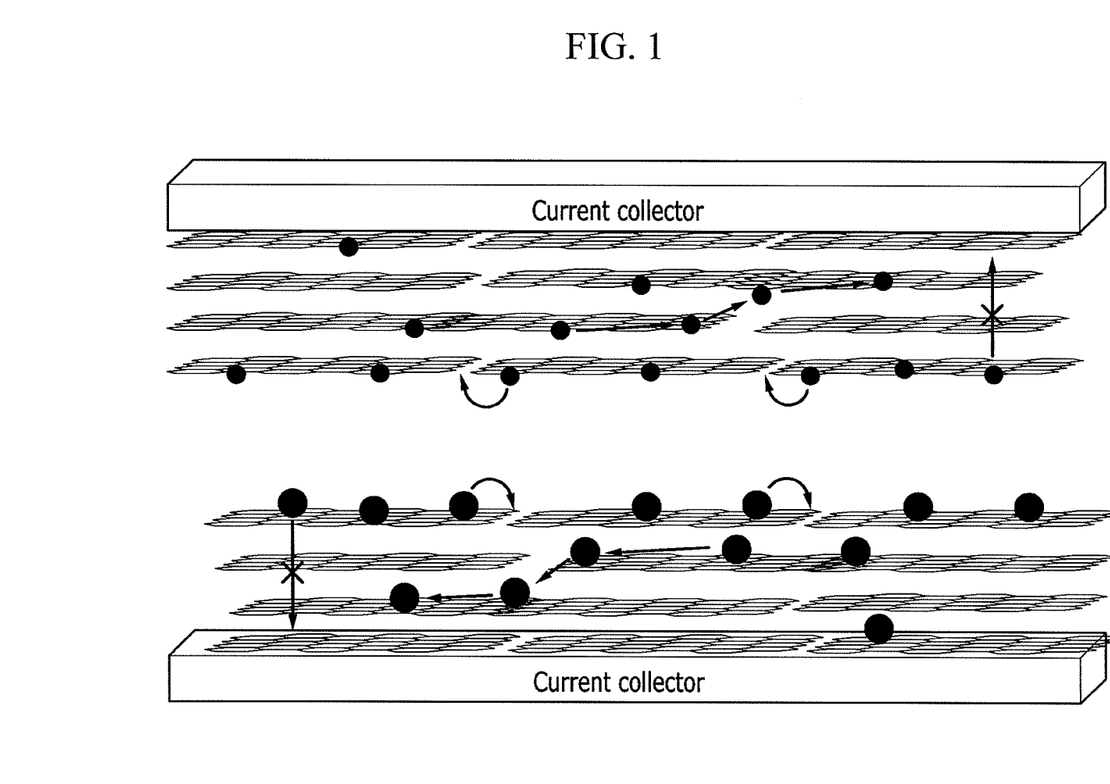
FIG. 1 shows a schematic view of a stacked graphene electrode structure of a conventional supercapacitor.
Figure 2:
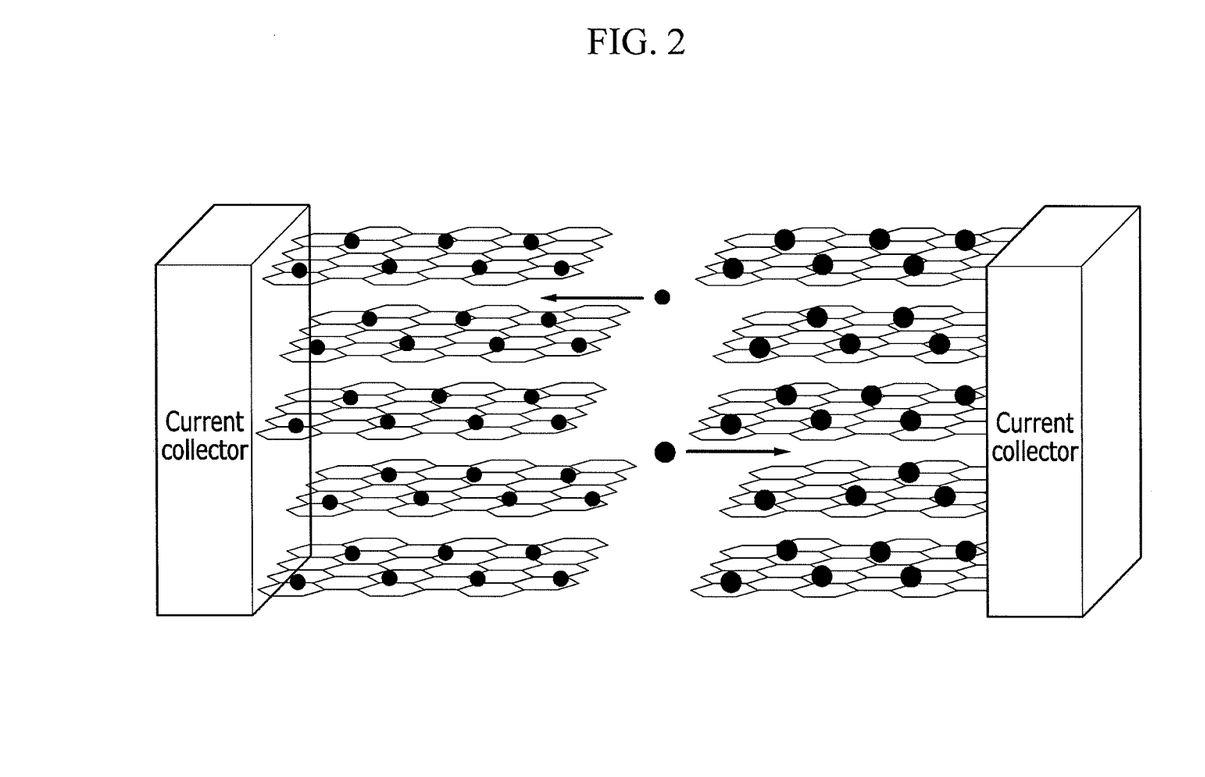
FIG. 2 shows a schematic view of a graphene electrode structure for an in-plane structured supercapacitor according to an embodiment of the present invention.

FIG. 1 shows a graphene electrode structure of a conventional supercapacitor with a stack structure, and FIG. 2 shows a graphene electrode structure of a micro-supercapacitor with an in-plane structure according to an exemplary embodiment of the present invention.

Referring to FIG. 1, access of electrolyte ions between two stacked graphene electrodes is not easy so transfer of the ions is not efficient and charge storage capacity is resultantly reduced. Referring to FIG. 2, the electrolyte ions easily access a graphene interlayer by allowing the ions to access in an in-plane direction of the graphene layer. Accordingly, a moving distance between the two electrodes is reduced and charge storing efficiency is increased.

The in-plane structure is manufactured through a two-dimensional patterning method. A UV lithography method used in a semiconductor process, a mechanical patterning method using a cutter, a method using laser beans, a printing method (e.g., inkjet printing), or an imprinting method can be used for the two-dimensional patterning method.

When considering that the film-type supercapacitor according to the exemplary embodiment of the present invention is applicable to a very small device or microelectromechanical systems (MEMS), the method for manufacturing the electrode by using the patterning method is similar to the conventional film process so it is easy to realize the manufacturing process.

Regarding the supercapacitor with the in-plane structure generated by two-dimensionally patterning the film electrode (hereinafter, graphene film electrode) made of graphene or a graphene oxide material, a supercapacitor of from the macro-scale to the micro-scale or the nano-scale can be manufactured by controlling the thickness of the graphene film. That is, a medium to large supercapacitor is manufactured by increasing the thickness of the graphene film, a micro-supercapacitor is manufactured by using a graphene film with a micro-size thickness, and a nano-supercapacitor is manufactured by using a graphene film with a nano-size thickness.

Therefore, the film-type supercapacitor according to the embodiment of the present invention is usable for various kinds of nano-supercapacitors or a power device of general medium to large devices depending on the film thickness according to various other exemplary embodiments.

Manufacturing Process

1) Manufacturing of an Electrode Material

A graphene oxide exemplifies an electrode material used for configuring the electrode. The graphene oxide can be manufactured by chemically delaminating graphite, and as a detailed example, a graphene oxide can be manufactured by referring to the modified Hummer's method (Ruoff et al., Carbon 2009, Vol. 47, pp. 145-152).

The manufactured graphene oxide (20 mg) is put into 10 cc deionized water and is dispersed through ultrasonic wave processing for 30 minutes with an ultrasonic cleaner to thus generate a graphene oxide solution. The graphene oxide solution is filtered by using a vacuum filtering device in which a Durapore membrane filter is installed.

The graphene oxide can be manufactured by using various methods such as a film manufacturing method through chemical vapor deposition, a film manufacturing method through casting, and a film manufacturing method through coating in addition to the above-noted vacuum filtering method.

2) Manufacturing of a Micro-Supercapacitor

Figure 3:
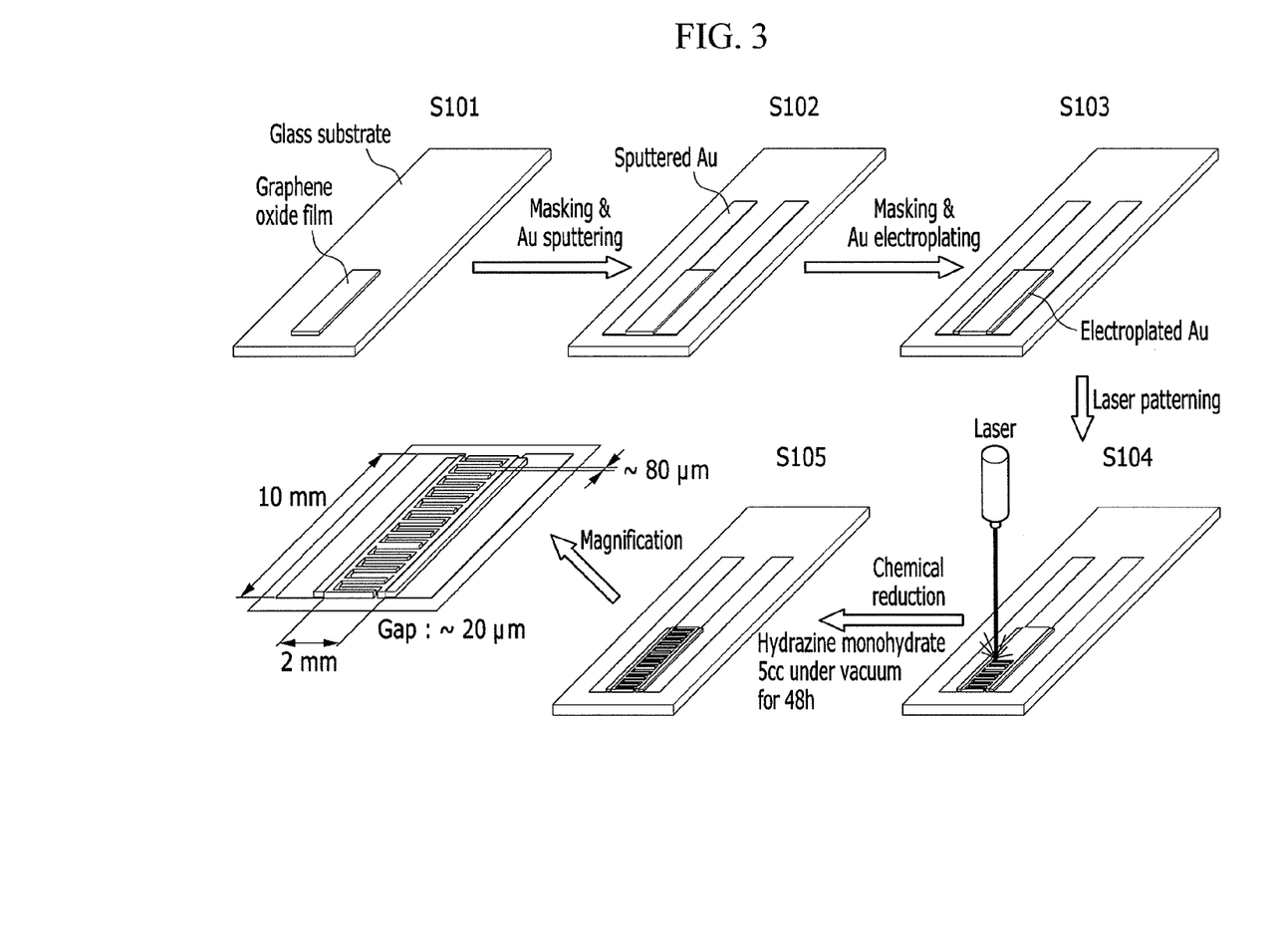
FIG. 3 shows a schematic view of a process for manufacturing a supercapacitor.
Figure 4:
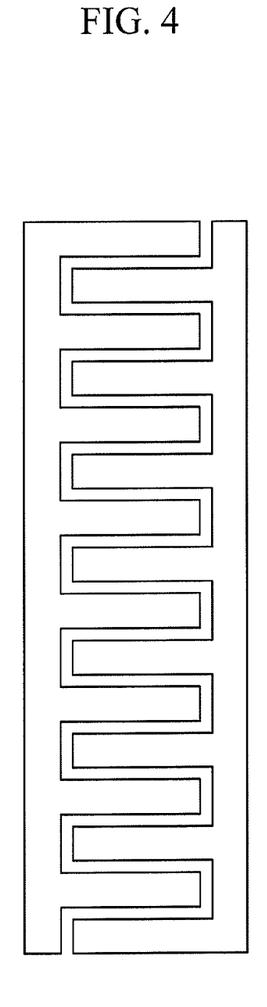
FIG. 4 to FIG. 7 show other exemplary embodiments of a pattern that is usable for a separation electrode.
Figure 5:
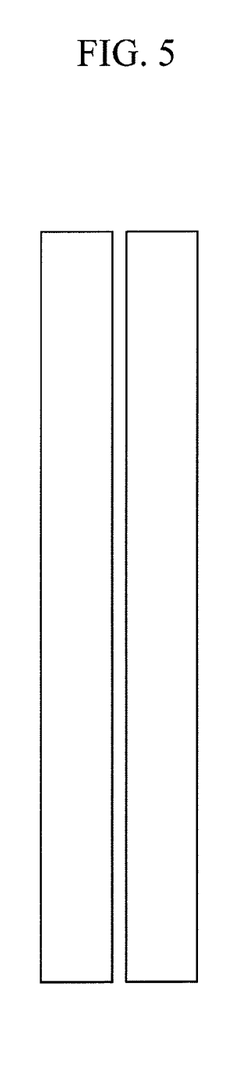
Figure 6:
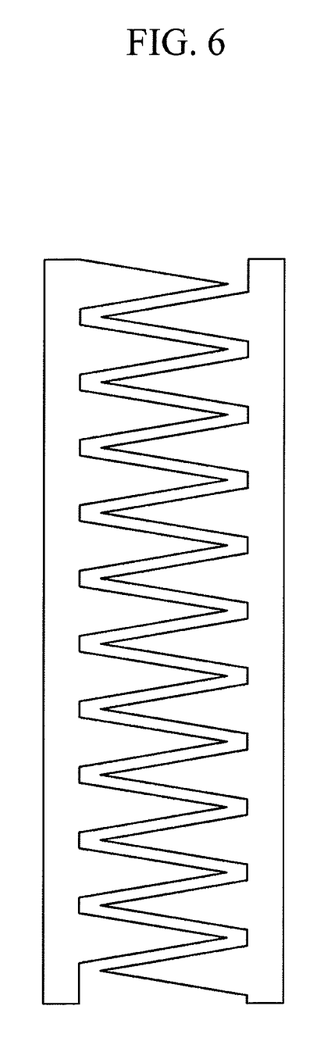
Figure 7:
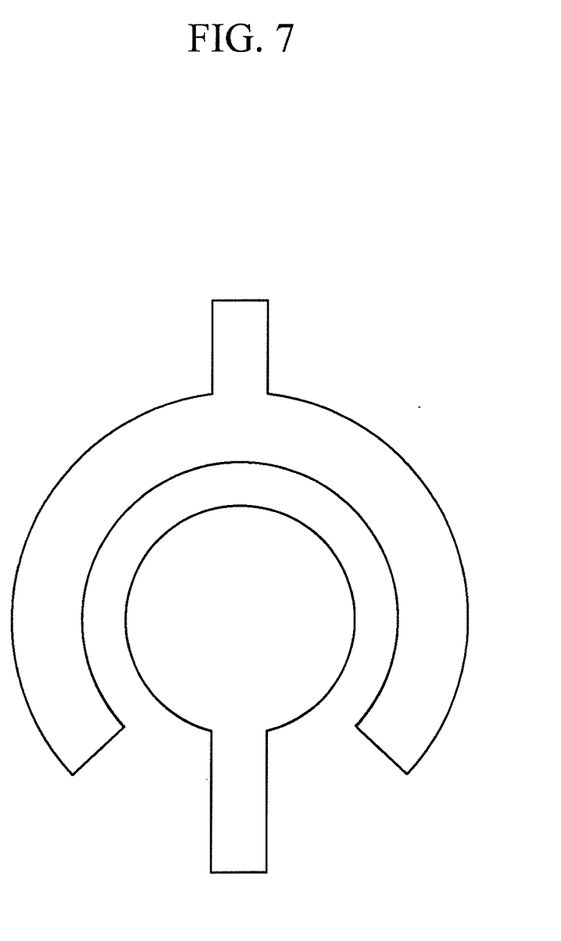

FIG. 3 sequentially shows a process for manufacturing a micro-supercapacitor according to an embodiment of the present invention.

As shown in FIG. 3, a heat treated graphene oxide film 12 (see FIG. 8) is incised with a predetermined size (for example 2×10 mm$^2$) by using an ultraviolet (UV) laser drilling system, and it is then attached to a cleaned slide glass 10 (see FIG. 8) by using an epoxy (S101). A predetermined mask (not shown) is provided on the glass 10, and titanium (~200 nm) and gold (~700 nm) are sputter-deposited to form a current collector 14 (see FIG. 8) (S102). The current collector 14 can also be formed by a thin film deposition method such as chemical vapor deposition or thermal deposition as well as the sputtering deposition, it can be formed through a plating method such as electroplating, electroless plating, or phoretic plating, and it can be formed through various kinds of methods such as screen printing, casting, or film attachment.

To reinforce a bonding part of the current collector 14 and the graphene oxide film 12, an edge where the graphene oxide film and the current collector meet can be gold plated 16 (see FIG. 8) with a thickness of less than 2 um. As an example of the gold plating process, a gold plating solution is manufactured by dissolving KAu(CN)2 in distilled water at a concentration of 10 g/l, stainless steel is used as an anode, a supercapacitor is installed as a cathode, and a current is controlled to flow thereto to reach a current density of 1 mA/cm2 to perform a plating process for 25 minutes at a temperature of 60° C. In detail, the supercapacitor is masked with a plating tape, and the edge where the graphene oxide film 12 and the current collector 14 meet is exposed and is then dipped into the gold plating solution (S103).

A gap with a width that is less than 20 μm is patterned in a predetermined shape on a surface of the graphene oxide film 12 by using the ultraviolet laser drilling system to form two independent electrodes (S104). The separate electrodes can be formed by ladder shape patterning as shown in FIG. 3, it can also be formed by linear, circular, or zigzag patterning, and other types of patterns are usable when the two independent electrodes are formed. FIG. 4 to FIG. 7 show examples of the patterns that can be used for the separate electrode, exemplifying a ladder shape, a line, a circle, and a modified zigzag.

Finally, the supercapacitor together with 5 cc of hydrazine monohydrate (98% Aldrich) is put into a vacuum desiccator for 48 hours to chemically reduce the graphene oxide electrode (S105). In addition to this, in order to chemically reduce the graphene oxide electrode, the manufactured supercapacitor or the graphene electrode film is dipped into a solution having a reductive material to reduce it in an aqueous solution, a reductive gas is used to reduce it in the gas, or it can be reduced through a heat treatment, and other various methods are applicable.

Figure 8:
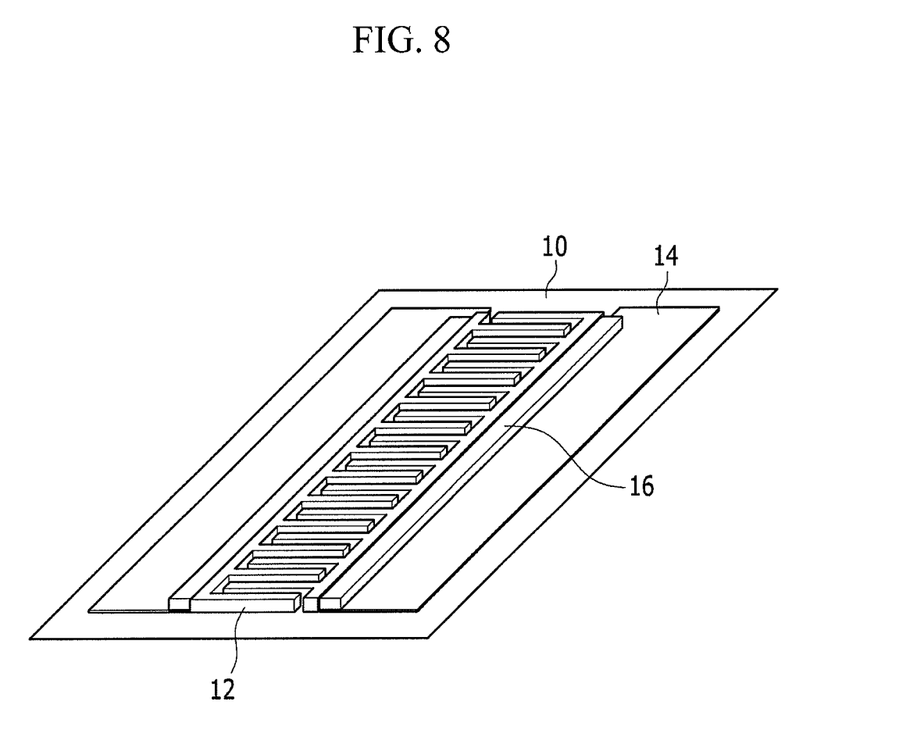
FIG. 8 shows a configuration diagram of a supercapacitor that is manufactured through a manufacturing process shown in FIG. 3.
Figure 9:
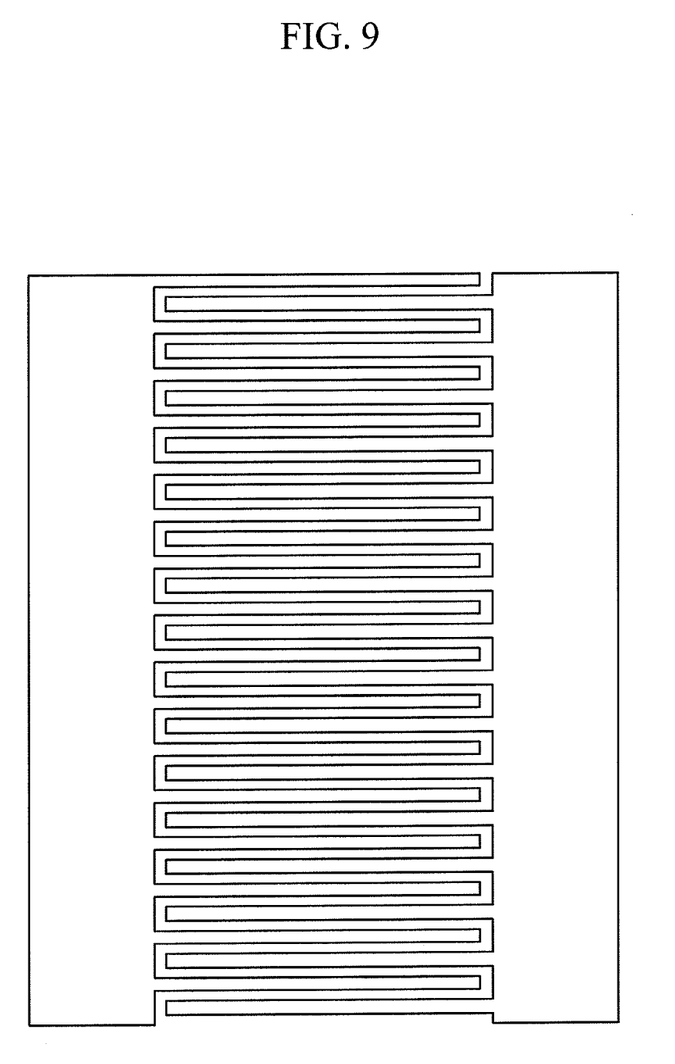
FIG. 9 shows a photograph of a two-dimensional pattern of a manufactured supercapacitor.

For reference, FIG. 8 shows a schematic diagram of a manufactured film-type micro-supercapacitor, and FIG. 9 shows a photograph of a two-dimensional pattern portion.

An additional process is allowable to improve performance of the graphene film. That is, performance improvement caused by a pseudocapacitive effect can be expected by inducing a defect and functional group to the graphene film by using various methods such as dipping the supercapacitor or the graphene film into a KOH solution or performing a plasma process.

3) Measuring of an Electrochemical Characteristic

The electrochemical characteristic of the supercapacitor is measured by using a 5.5 M KOH solution as an electrolyte solution. In this instance, the electrolyte is selectable by a person skilled in the art, and various types of electrolytes including a water-soluble electrolyte, an organic electrolyte, an ionic liquid electrolyte, or a solid electrolyte are usable.

Cyclic voltammetry, charge-discharge curve, and impedance are measured by using a potentiostat. The cyclic voltammetry is measured within the range of 0 to 1 V at a speed of 10 to 1000 mV/s, and the impedance is measured through electrochemical impedance spectroscopy within the range of 500 KHz to 10 mHz with a DC bias of 0 V having a sinusoidal signal of 10 mV. Capacity is acquired by integrating a curve that is obtained from the cyclic voltammetry, and the power density and the energy density are calculated from the data that are generated through the above-noted measurement.

Figure 10:
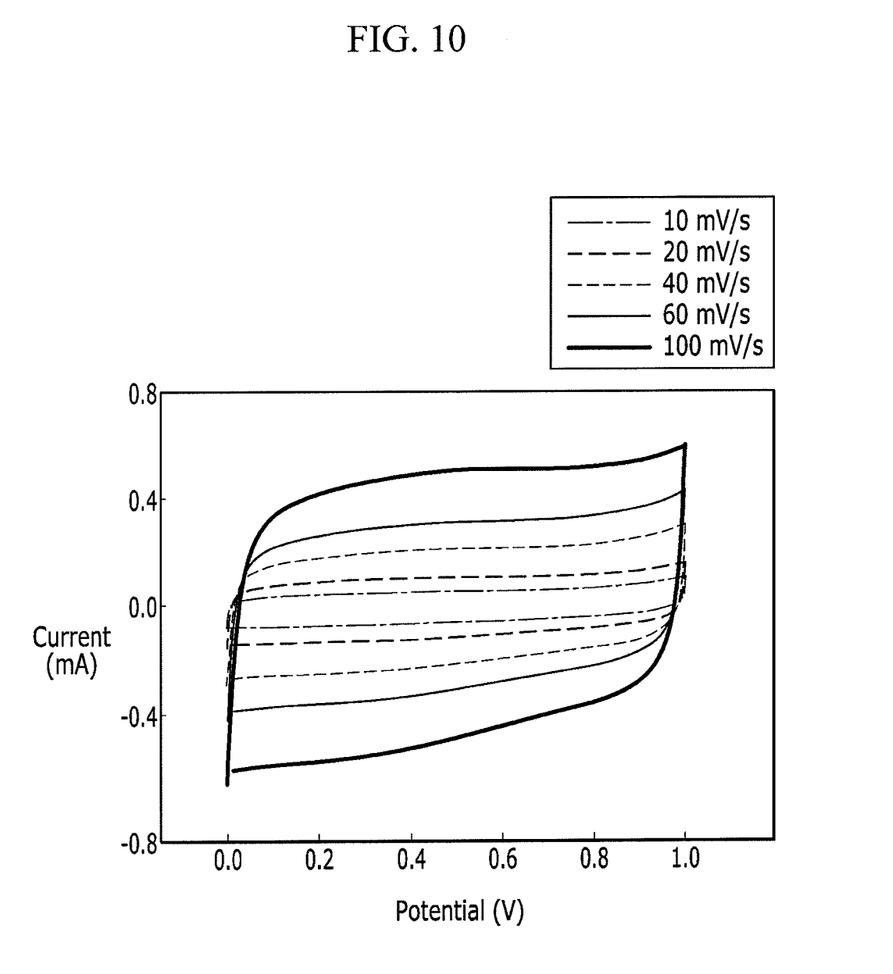
FIG. 10 shows actual data of a cyclic voltammogram measured by using a manufactured supercapacitor.

FIG. 10 show actual data of a cyclic voltammogram measurement by using a manufactured supercapacitor.

As shown in FIG. 10, the shape of the cyclic voltammogram looks similar to a rectangular. Considering that the cyclic voltammogram shape of the ideal capacitor is a rectangle, it is found that an electrical double layer is efficiently formed on the supercapacitor electrode.

As described above, the acquired capacity is 185.4 $Fg^{-1}$ and 33.4 $mFcm^{-2}$ which is substantially 330 times greater than the value of the ultrathin film supercapacitor (Yoo et al., Nano letters, 2011, Vol. 11, pp. 1423-1427) that was less than 400 $mFcm^{-2}$. This means that the graphene stacked in the micro-scale can be efficiently used as the electrode of the supercapacitor.

Figure 11:
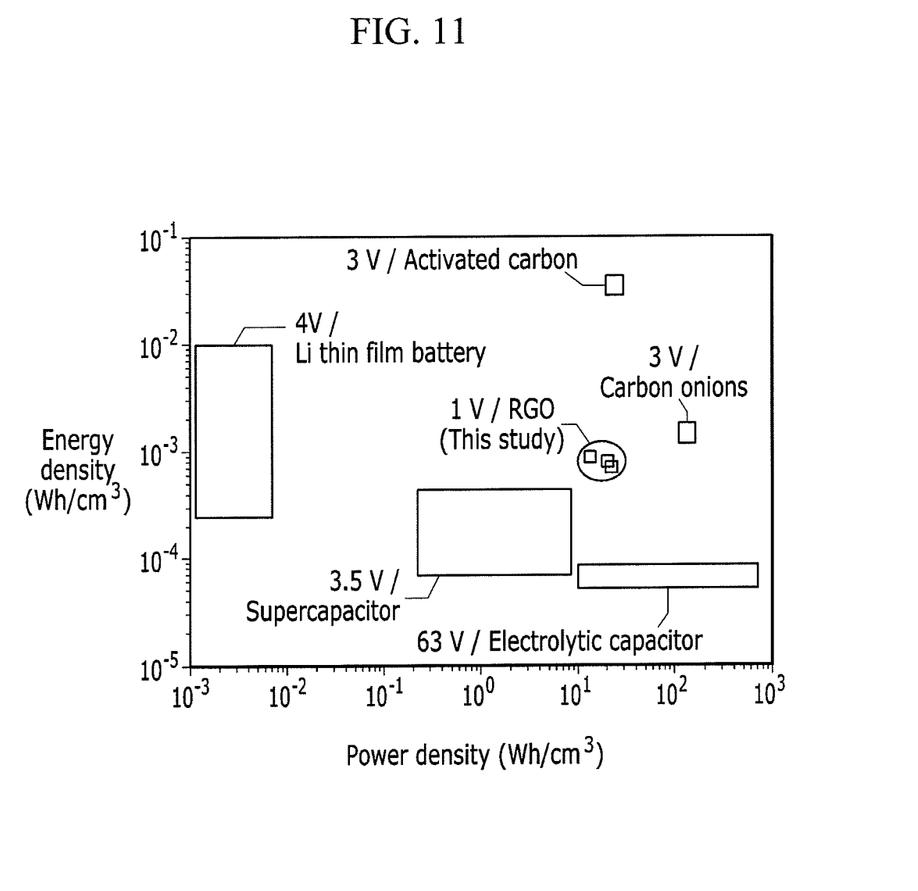
FIG. 11 shows a Ragone plot for showing a relationship between energy density and power density with respect to volume.

FIG. 11 shows a Ragone plot for indicating a relationship between energy density and power density with respect to volume.

The energy density (6.4 Whkg-1) and the power density (less than 100 kWkg-1) of the micro-scale supercapacitor according to the embodiment of the present invention show values that are equal to macro-scale supercapacitors that are manufactured according to a conventional method using graphene.

That is, as shown in FIG. 11, the capacity per volume is 30 $F/cm^3$ and the energy density is 0.87 $mWh/cm^3$, and the power density (13.34 $W/cm^3$) per volume is equivalent to the energy density of the lithium battery per volume, while the power density shows a value that is greater than the area of the supercapacitor with an operational voltage of 3.5V and that corresponds to the area of the electrolytic capacitor.

In this instance, the micro-supercapacitor with the operational voltage of 1 V according to the embodiment of the present invention has performance that is similar to other micro-supercapacitors using an organic electrolyte with the operational voltage of 3 V. In detail, the characteristics of the micro-supercapacitor including high electrical conductivity of the graphene, a short ion diffusion distance, and the in-plane structure has allowed efficient charge transfer of graphene interlayer ions and resultantly has allowed manufacturing of the supercapacitor with great efficiency.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, when the in-plane structure according to the two-dimensional patterning according to the embodiment of the present invention is formed, a carbon material, a metal oxide, a nitride, or a conductive organic material can be used for the electrode material in addition to the graphene or graphene oxide.

What is claimed is:

1. A method for manufacturing a supercapacitor, comprising:
    forming a current collector on both side of an electrode film attached to a substrate;
    forming two separated electrodes by patterning the electrode film with an in-plane structure; and
    reinforcing a bonding portion of the electrode film and the current collector through metal plating.

2. The method of claim 1, wherein
    the current collector is formed by using one of a thin film deposition method, a plating method, a screen printing method, a casting method, and a film attachment method.

3. The method of claim 1, wherein
    graphene or graphene oxide is used for the electrode film.

4. The method of claim 1, further comprising supplying an electrolyte to the manufactured supercapacitor.

5. The method of claim 4, wherein
    one of a water-soluble electrolyte, an organic electrolyte, an ionic liquid electrolyte, and a solid electrolyte is used for the electrolyte.

6. The method of claim 1, wherein
    the separated electrodes are formed by patterning continuous gaps on the electrode film by using one of optical patterning, mechanical patterning, chemical etching, printing, and imprinting.

7. The method of claim 6, wherein
    the separated electrode is patterned with one of a ladder shape, a line, a circle, and a zigzag.

8. The method of claim 1, wherein
    the electrode film is configured by using a carbon material, a metal oxide, a nitride, and a conductive organic material.

9. A method for manufacturing a supercapacitor, comprising:
    forming a current collector on both side of an electrode film attached to a substrate;
    forming two separated electrodes by patterning the electrode film with an in-plane structure; and
    chemically reducing the electrode film or the separated electrode.

10. The method of claim 9, wherein
    the chemical reduction is performed by using one of a method of placing the electrode film or the separated electrode in a reductive gas, a method of dipping the electrode film or the separated electrode into an aqueous solution including a reductive material, and a method of heat treating the electrode film or the separated electrode.

11. A method for manufacturing a supercapacitor, comprising:
    forming a current collector on both side of an electrode film attached to a substrate;
    forming two separated electrodes by patterning the electrode film with an in-plane structure; and
    inducing a defect and functional group to the electrode film or the separated electrode so as to acquire a pseudocapacitive effect.

12. The method of claim 11, wherein
    a defect and functional group is induced by using one of a method for dipping the electrode film or the separated electrode into a KOH solution and a method for plasma processing the electrode film or the separated electrode.

* * * * *

UNITED STATES PATENT AND TRADEMARK OFFICE
CERTIFICATE OF CORRECTION

| | | |
|---|---|---|
| PATENT NO. | : 8,951,306 B2 | Page 1 of 1 |
| APPLICATION NO. | : 13/612106 | |
| DATED | : February 10, 2015 | |
| INVENTOR(S) | : Yu et al. | |

It is certified that error appears in the above-identified patent and that said Letters Patent is hereby corrected as shown below:

Title page,
Item (73) Assignee: "Daejeon (KP)" should read --Deajeon (KR)--.

Signed and Sealed this
Twenty-second Day of December, 2015

Michelle K. Lee
*Director of the United States Patent and Trademark Office*